US00RE42240E

(19) United States
(12) Reissued Patent
De Luca et al.

(10) Patent Number: US RE42,240 E
(45) Date of Reissued Patent: Mar. 22, 2011

(54) INFLATABLE, CUSHIONING, BUBBLE WRAP PRODUCT HAVING MULTIPLE, INTERCONNECTED, BUBBLE STRUCTURES

(75) Inventors: Nicholas P. De Luca, Washington, DC (US); Oliver M. Reyes, Berkeley, CA (US); Philippe M. Jacques, Benicia, CA (US)

(73) Assignee: Free-Flow Packaging International, Inc., Redwood City, CA (US)

(21) Appl. No.: 11/485,647

(22) Filed: Jul. 13, 2006

(Under 37 CFR 1.47)

Related U.S. Patent Documents

Reissue of:
(64) Patent No.: 6,761,960
Issued: Jul. 13, 2004
Appl. No.: 10/160,200
Filed: May 28, 2002

U.S. Applications:
(63) Continuation of application No. 09/717,782, filed on Nov. 21, 2000, now Pat. No. 6,410,119.

(51) Int. Cl.
*B32B 3/00* (2006.01)
*B65D 81/02* (2006.01)
*B65D 81/03* (2006.01)

(52) U.S. Cl. ..... 428/166; 428/178; 229/87.02; 206/522

(58) Field of Classification Search ..... 428/166, 428/172, 178; 493/967; 206/522; 229/87.02
See application file for complete search history.

(56) References Cited

U.S. PATENT DOCUMENTS 2,904,100 A 9/1959 Fener
3,253,122 A 5/1966 Kochmer et al.
3,294,387 A 12/1966 Chavannes
3,359,703 A 12/1967 Quaadgras (Continued)

FOREIGN PATENT DOCUMENTS

| | | | |
|---|---|---|---|
| DE | 297 17 551 | U1 | 3/1998 |
| DE | 199 13 408 | A1 | 10/2000 |
| DE | 199 13 408 | C2 | 10/2000 |
| EP | 0836926 | A2 | 4/1998 |
| FR | 2389547 | | 12/1978 |
| FR | 2580597 | | 10/1986 |
| GB | 2218401 | | 11/1989 |
| JP | 7/16961 | | 1/1995 |

(Continued)

OTHER PUBLICATIONS

Claims from 10/031,111 (PCT/NL01/00351).
Fuss and Yampolsky declaration, 09/488,622.
Air–Fil 1200 photographs (no date but prior to application's filing date).

*Primary Examiner*—Donald Loney
(74) *Attorney, Agent, or Firm*—Banner & Witcoff, Ltd.

(57) ABSTRACT

An inflatable, conformable, cushioning, packaging product comprises a plurality of individual inflatable strips of multiple bubble cushioning structures. Each individual inflatable strip has a plurality of bubble chambers with each bubble chamber interconnected to an adjacent bubble chamber by an interconnecting passageway which is smaller in size and internal volume than the bubble chambers, but which is sufficiently large to enable air volume and pressure in one inflated bubble chamber to be transmitted to adjacent bubble chambers for distributing a shock load on one bubble chamber along the entire length of the individual inflatable strip of interconnected bubble chambers. Each individual inflatable strip is defined between two laterally extending spaced apart peripheral seal lines which have an undulating configuration free of corner shapes which could concentrate stresses.

39 Claims, 7 Drawing Sheets

U.S. PATENT DOCUMENTS

| | | | |
|---|---|---|---|
| 3,389,534 | A | 6/1968 | Pendelton |
| 3,492,783 | A | 2/1970 | Dohmeier |
| 3,554,135 | A | 1/1971 | Duvall et al. |
| 3,575,757 | A | 4/1971 | Smith |
| 3,660,189 | A | 5/1972 | Troy |
| 3,667,593 | A | 6/1972 | Pendleton |
| 3,674,614 | A | 7/1972 | Templeton |
| 3,703,430 | A | 11/1972 | Rich |
| 3,769,145 | A | 10/1973 | Gresham et al. |
| 3,817,803 | A | 6/1974 | Horskey |
| 3,868,285 | A | 2/1975 | Troy |
| 3,889,743 | A | 6/1975 | Presnick |
| 3,938,298 | A | 2/1976 | Luhman et al. |
| 4,017,351 | A | 4/1977 | Larson et al. |
| 4,021,283 | A | 5/1977 | Weikert |
| 4,096,306 | A | 6/1978 | Larson |
| 4,169,002 | A | 9/1979 | Larson |
| 4,287,250 | A | 9/1981 | Rudy |
| 4,415,398 | A | 11/1983 | Ottaviano |
| 4,465,188 | A | 8/1984 | Soroka et al. |
| 4,551,379 | A | 11/1985 | Kerr |
| 4,564,407 | A | 1/1986 | Tsuruta |
| 4,586,319 | A | 5/1986 | Ausnit |
| 4,596,111 | A | 6/1986 | Ambrose |
| 4,680,073 | A | 7/1987 | Brunner et al. |
| 4,793,123 | A | 12/1988 | Pharo |
| 4,847,126 | A | 7/1989 | Yamashiro et al. |
| 4,850,912 | A | 7/1989 | Koyanagi |
| 4,872,558 | A | 10/1989 | Pharo |
| 4,874,093 | A | 10/1989 | Pharo |
| 4,918,904 | A | 4/1990 | Pharo |
| 4,941,754 | A | 7/1990 | Murdock |
| 4,949,530 | A | 8/1990 | Pharo |
| 4,981,006 | A | 1/1991 | Caenazzo et al. |
| 5,009,318 | A | 4/1991 | Lepinoy |
| 5,046,258 | A | 9/1991 | Cahill et al. |
| 5,203,761 | A | 4/1993 | Reichental et al. |
| 5,216,868 | A | 6/1993 | Cooper et al. |
| 5,340,632 | A | 8/1994 | Chappuis |
| 5,351,828 | A | 10/1994 | Becker et al. |
| 5,402,892 | A | 4/1995 | Jaszai |
| 5,406,770 | A | 4/1995 | Fikacek |
| 5,427,830 | A | 6/1995 | Pharo |
| 5,437,068 | A * | 8/1995 | Fisher ..... 5/712 |
| 5,447,235 | A | 9/1995 | Pharo |
| 5,454,642 | A | 10/1995 | De Luca |
| 5,535,888 | A | 7/1996 | De Luca |
| 5,552,003 | A | 9/1996 | Hoover et al. |
| 5,581,983 | A | 12/1996 | Murakami |
| 5,604,016 | A | 2/1997 | Allegre |
| 5,651,237 | A | 7/1997 | De Luca |
| 5,658,632 | A | 8/1997 | Krabill |
| 5,660,662 | A | 8/1997 | Testone |
| 5,692,833 | A | 12/1997 | DeLuca |
| 5,693,163 | A | 12/1997 | Hoover et al. |
| 5,755,082 | A | 5/1998 | Takahashi et al. |
| 5,755,328 | A | 5/1998 | DeLuca |
| 5,824,392 | A | 10/1998 | Gotoh et al. |
| 5,858,153 | A | 1/1999 | Mack |
| 5,873,215 | A | 2/1999 | Aquarius et al. |
| 5,901,393 | A | 5/1999 | Pepe et al. |
| 5,926,823 | A | 7/1999 | Okumura et al. |
| 5,937,614 | A | 8/1999 | Watkins et al. |
| 5,942,076 | A | 8/1999 | Salerno et al. |
| RE36,501 | E | 1/2000 | Hoover et al. |
| 6,015,047 | A | 1/2000 | Greenland |
| 6,209,286 | B1 | 4/2001 | Perkins et al. |
| 6,272,815 | B1 | 8/2001 | Todd et al. |
| 6,375,785 | B1 | 4/2002 | Aquarius |
| 6,410,119 | B1 | 6/2002 | De Luca et al. |
| 6,423,166 | B1 | 7/2002 | Simhaee |
| 6,460,313 | B1 | 10/2002 | Cooper |
| 6,582,800 | B2 | 6/2003 | Fuss et al. |
| 6,659,150 | B1 | 12/2003 | Perkins et al. |
| 6,786,022 | B2 | 9/2004 | Fuss et al. |
| 2003/0118778 | A1 | 6/2003 | Perkins et al. |
| 2004/0206050 | A1 | 10/2004 | Fuss et al. |

FOREIGN PATENT DOCUMENTS

| | | |
|---|---|---|
| JP | 7/165267 | 6/1995 |
| WO | WO 94/07678 | 4/1994 |
| WO | WO 98/40276 | 9/1998 |
| WO | WO 00/43198 | 7/2000 |
| WO | WO 00/43270 | 7/2000 |
| WO | WO 00/53501 | 9/2000 |
| WO | WO 00 64672 | 11/2000 |
| WO | WO 01/85434 A2 | 11/2001 |

* cited by examiner

INFLATABLE, CUSHIONING, BUBBLE WRAP PRODUCT HAVING MULTIPLE, INTERCONNECTED, BUBBLE STRUCTURES

Matter enclosed in heavy brackets [ ] appears in the original patent but forms no part of this reissue specification; matter printed in italics indicates the additions made by reissue.

This is a continuation of Ser. No. 09/717,782, filed Nov. 21, 2000, now U.S. Pat. No. 6,410,119.

BACKGROUND OF THE INVENTION

This invention relates to an inflatable, cushioning, bubble wrap product.

This invention relates particularly to a bubble wrap product which has the bubbles formed in individual inflatable strips. The individual inflatable strips extend laterally across the width of a sheet of film material, and each individual inflatable strip has a plurality of bubble chambers with each bubble chamber interconnected to an adjacent bubble chamber by an interconnecting passageway. The interconnected passageway is smaller in size and in internal volume that the bubble chambers but is sufficiently large to enable air volume and pressure in one inflated bubble chamber to be transmitted to adjacent bubble chambers for distributing a shock load on one bubble chamber along the entire length of the individual inflatable strip of interconnected bubble chambers.

This invention relates particularly to a bubble wrap product in which each individual inflatable strip is defined between two laterally extending spaced apart peripheral seal lines which have an undulating configuration free of corner shapes which could concentrate stresses.

Webs of plastic film which are constructed to permit the production of patterns of air filled envelopes, cushions and pillows have (in the past ten years or so) been used extensively for cushioning objects to be transported in containers.

The thin webs incorporate two thin sheets of plastic film and are inexpensive, tough, resilient and recyclable.

Inflated pillow packagings which are created from these webs of plastic film are used for void-fill packaging to replace products such as crumpled paper or polyethylene peanuts and for protective packaging to replace molded or extruded forms.

U.S. Pat. Nos. 5,454,642; 5,651,237; 5,755,328; 4,017,351; and 5,824,392 disclose methods, apparatus, and webs of plastic film used for making strips of inflated pillow packaging of this general kind. Each of these U.S. patents is incorporated by reference in this application.

Co-pending applications Ser. No. 09/207,129 filed Dec. 8, 1998, now U.S. Pat. No. 6,116,000, Ser. No. 09/439,552 filed Nov. 12, 1999, now U.S. Pat. No. 6,209,286, and Ser. No. 09/638,843, filed Aug. 14, 2000, also disclose methods, apparatus and webs of plastic film of this general kind. Each of these three co-pending applications is assigned to the same assignee as the assignee of this application. Each of these three co-pending applications is incorporated in this application by reference.

It is a primary object of the present invention to construct a web of two sheets of film material in a pattern of seal lines which enables an inflatable, conformable, cushioning, multiple bubble strip, packaging product to be produced which has significant functional and economic advantages over existing bubble packaging.

It is a related object to construct an inflatable packaging product which enables inflated bubble chambers to be large enough so that only a single layer of inflated packaging product can provide the necessary cushioning for many objects.

It is a related object to construct an inflatable packaging product in which substantially all of the area of the packaging product is available for inflation to provide cushioning.

It is a related object to construct an inflatable packaging product which is highly conformable to provide effective cushioning at all angles of possible shock loads on the object being shipped.

It is a related object to construct an inflatable packaging product in which the seal lines for inflatable bubble structures have an undulating configuration free of corner shapes or sharp bends which could concentrate stresses.

It is a related object to construct an inflatable packaging product having a plurality of individual inflatable strips of multiple bubble cushioning structures which extend laterally across the longitudinal length a web of inflated film material and in which each bubble chamber in an individual inflatable strip is interconnected to an adjacent bubble chamber by an interconnecting passageway which is smaller in size and internal volume than the bubble chambers but which is sufficiently large to enable air volume and pressure in one inflated bubble chamber to be transmitted to adjacent bubble chambers for distributing a shock load on one bubble chamber along the entire length of the inflatable strip of interconnected bubble chambers.

SUMMARY OF THE PRESENT INVENTION

An inflatable, conformable, cushioning, multiple bubble strip, packaging product is constructed for interposing between and engagement with both the interior surfaces of a shipping container and the outer surfaces of one or more objects packaged within the shipping container. The inflatable packaging product is constructed, when inflated, to reduce or to eliminate the transfer of shock load from the shipping container to the objects packaged within the shipping container.

The packaging product comprises a first sheet of film material and a second sheet of film material. The sheets have substantially equal lengths and substantially equal widths. The sheets are joined together as a web in a pattern of seal lines.

The pattern of seal lines form an inflation channel which extends linearly along the length of the sheets for receiving pressurized air from an outlet end of an inflation tube.

The pattern of seal lines also form a plurality of individual inflatable strips of multiple bubble cushioning structures which extend laterally from the inflation channel.

Each individual inflatable strip has a plurality of bubble chambers with each bubble chamber interconnected to an adjacent bubble chamber by an interconnecting passageway which is smaller in size and internal volume than the bubble chambers but which is sufficiently large to enable air volume and pressure in one inflatable bubble chamber to be transmitted to adjacent bubble chambers for distributing a shock load on one bubble chamber along the entire length of the individual inflatable strip of interconnected bubble chambers.

Each individual inflatable strip of multiple bubble cushioning structures has an entrance port connecting the first bubble chamber in the strip to the inflation channel for receiving pressurized air at the inflation station to inflate all of the bubble chambers in the individual inflatable strip.

The entrance port is configured to permit the entrance port to be sealed by a line seal formed across the entrance port by a heated sealing element at a sealing station as the web of film material is continuously and uninterruptedly transported through the sealing station after the bubble chambers have been inflated at the inflation station.

Each individual inflatable strip is defined between two laterally extending spaced apart peripheral seal lines of the pattern. The peripheral seal lines have an undulating configuration free of corner shapes or sharp bends which could concentrate stresses.

The peripheral seal lines have a generally sinusoidal configuration as viewed from above the web formed by the two sheets.

In a preferred embodiment of the present invention the bubble chambers in one individual inflatable strip are laterally offset with respect to the bubble chambers in an immediately adjacent individual inflatable strip so that a bubble chamber in one inflatable strip is opposite an interconnecting passageway in an immediately adjacent inflatable strip.

In a preferred embodiment of the present invention a peripheral seal line on one side of a first inflatable strip is also a peripheral seal line for a second individual inflatable strip which is immediately adjacent said one side of the first inflatable strip.

In the present invention the bubble chambers can be made sufficiently large so that only a single layer of the inflated packaging product can provide the necessary cushioning for many objects.

In one embodiment of the present invention the inflation channel extends along one side edge of the web, and each individual inflatable strip extends across substantially the entire width of the web.

In another embodiment of the present invention the inflation channel extends along a center portion of the web, and the individual inflatable strips extend laterally outwardly from the central inflation channel toward the peripheral side edges of the web.

Inflatable packaging products which incorporate the features described above and which function as described above comprise additional objects of the invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric view showing a bubble wrap product constructed in accordance with one embodiment of the invention. FIG. 1 shows a patterned web of the bubble wrap product in the process of being inflated and sealed. The patterned web is taken off of a storage roll and then advanced through a machine. The machine inflates bubble chambers of the patterned web at an inflation station and then seals the air in the inflated bubble chambers at a sealing station.

In FIG. 3 the inflation channel extends through the center portion of the web while in FIG. 2 the inflation channel extends along one side portion of the web.

Figure 6:
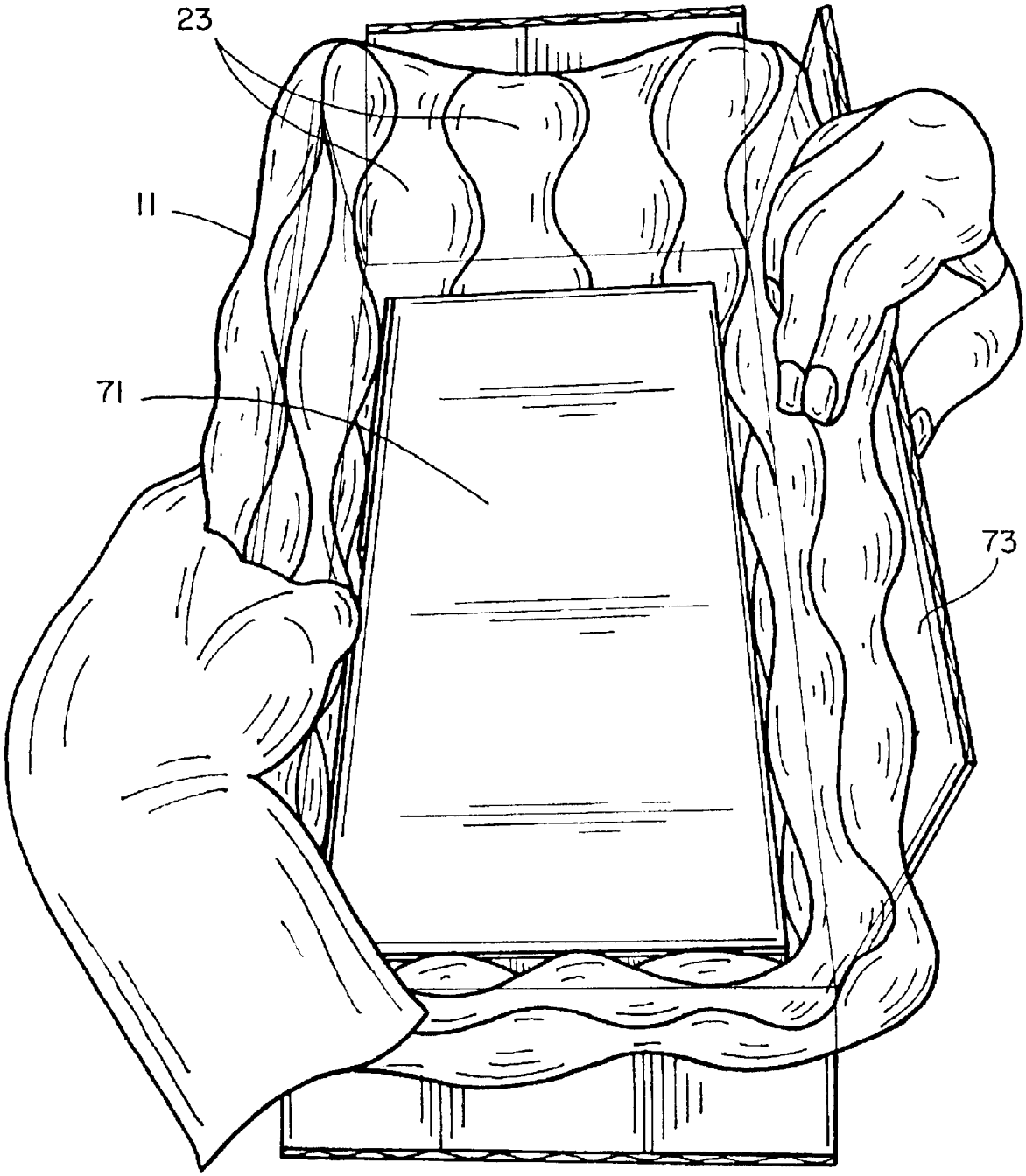

FIG. 6 is an isometric view showing how the inflated packaging product (see the inflated product shown in the lower part of FIG. 1) is used to envelope and cushion an object to be shipped within a shipping container. In FIG. 6 the object to be shipped is a generally rectangular shaped object. FIG. 6 shows how the construction of the inflated packaging product of the present invention is readily conformable to wrap around all surfaces of the rectangular object, including the corner areas of the object, to provide cushioning against shock loads imposed at any angle on the outer shipping container. FIG. 6 also shows how the shape, size and volumes of the inflated bubble chambers are large enough so that a single layer of the packaging product can provide the necessary cushioning for the object to be shipped.

Figure 7:
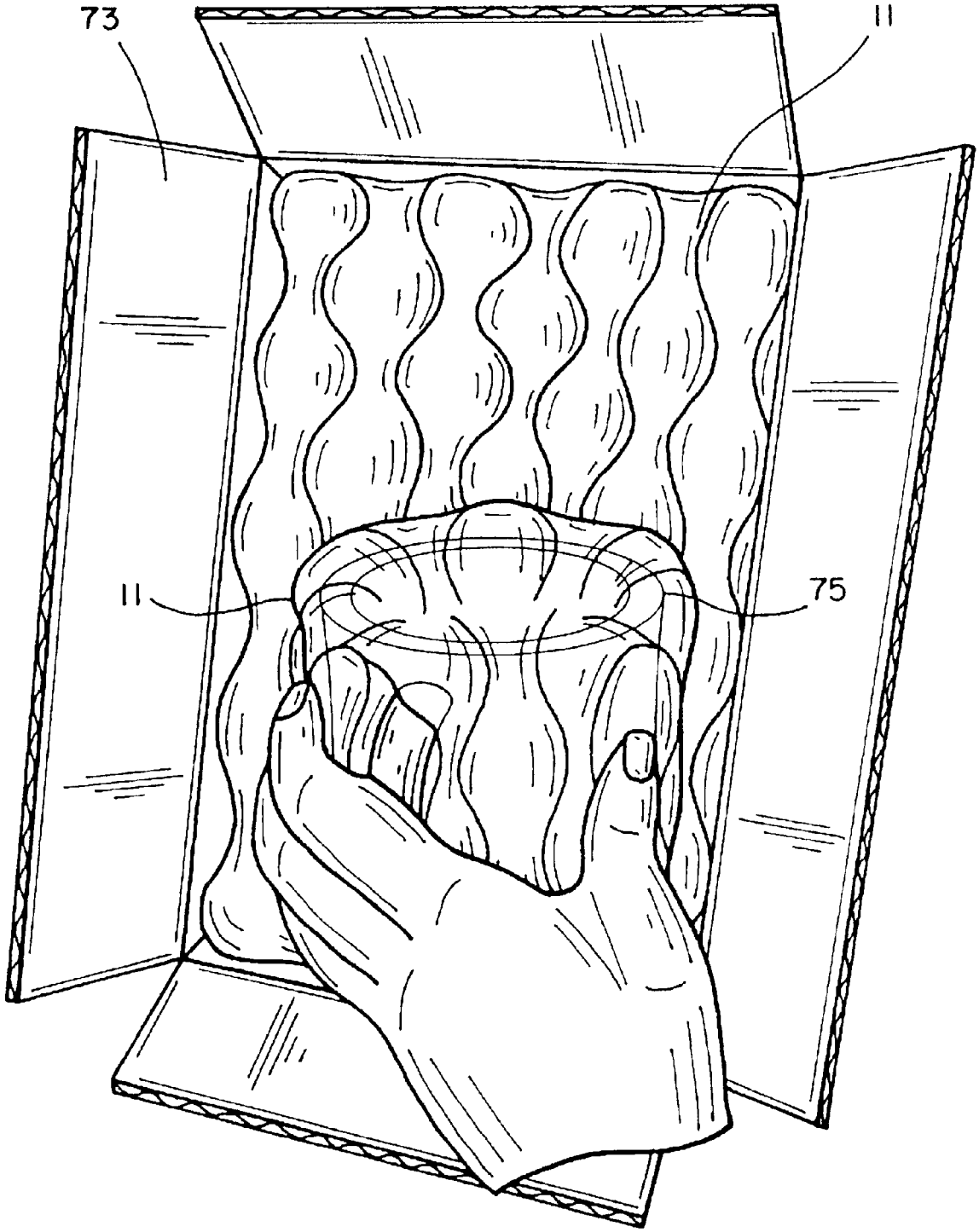

FIG. 7 is an isometric view like FIG. 6 but showing the inflated packaging product of the present invention can be wrapped about a cup to cushion the cup for shipment within the outside container.

DETAILED DESCRIPTION OF THE PREFERRED EMBODIMENTS

Figure 1:
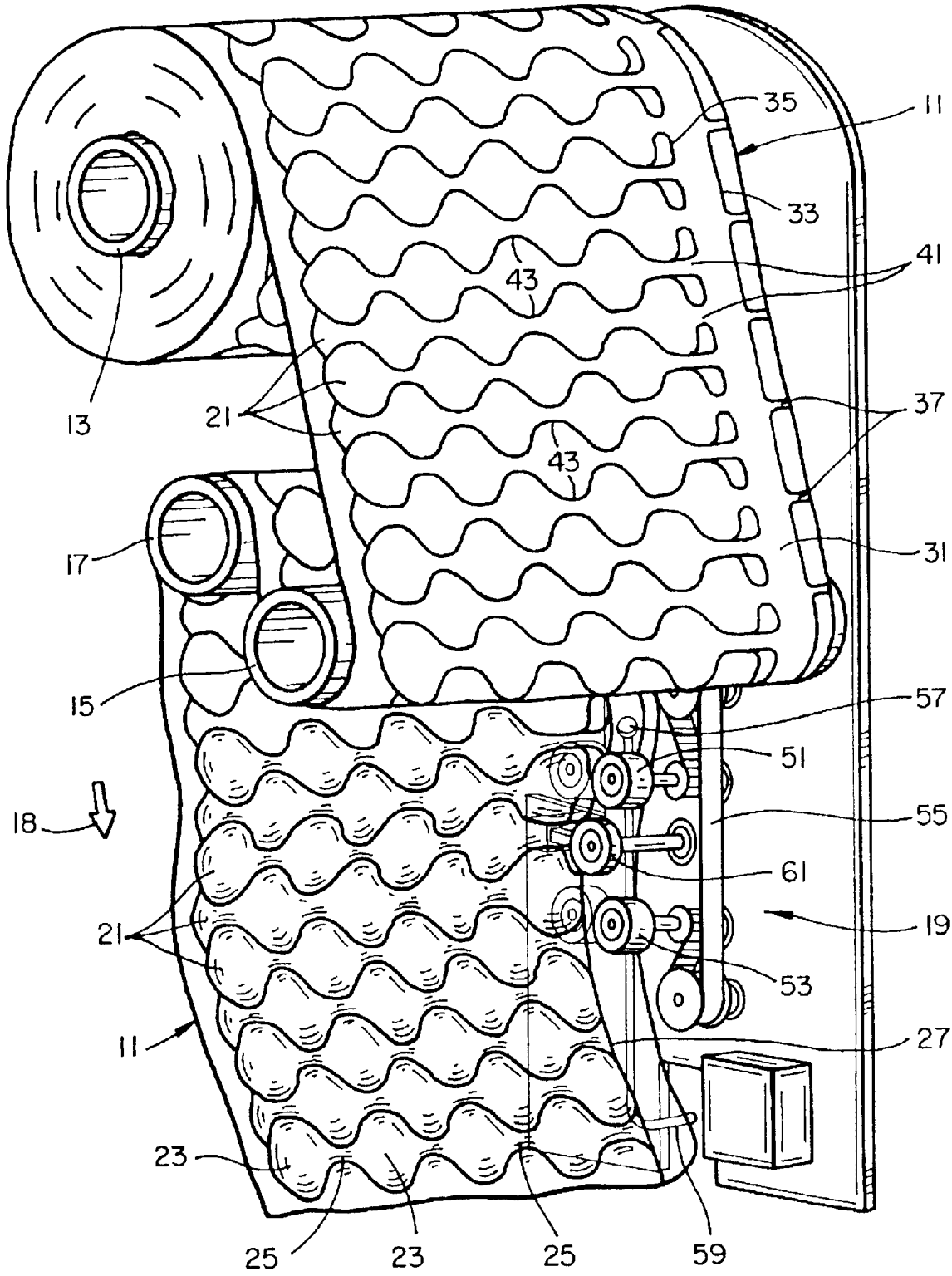

FIG. 1 is an isometric view showing a bubble wrap product 11 constructed in accordance with one embodiment of the present invention.

FIG. 1 shows a patterned web of the bubble wrap product 11 in the process of being inflated and sealed.

As illustrated in FIG. 1 the uninflated patterned web of the bubble wrap product 11 is stored on a storage roller 13 and is looped over guide rollers 15 and 17 as the web 11 is advanced, in the direction indicated by the block arrow 18, to and through a machine 19.

The machine 19 inflates bubble cushioning structures and interconnecting passageways with pressurized air at an inflation station and seals the pressurized air within the bubble chambers and the interconnecting passageways at a sealing station (as will be described in more detail below).

In the preferred embodiments of the present invention the bubble wrap product 11 is constructed so that the inflation and sealing can be accomplished as the web 11 is moved continuously, without interruption or intermittent stopping, through the machine 19 during a production run. This will also be described in more detail below.

The lower part of FIG. 1 shows the web 11 in its inflated form and ready for use as a cushioning packaging product.

In the inflated form individual inflated strips 21 extend laterally across the width of the web 11.

Each individual inflated strip 21 comprises a series of inflated bubble chambers 23 with each bubble chamber 23 interconnected to an adjacent bubble chamber 23 by an interconnecting passageway 25.

The interconnecting passageways 25 are smaller in size and internal volume than the bubble chambers 23, but the passageways 25 are sufficiently large to enable air volume and pressure in one inflated bubble chamber 23 to be transmitted to adjacent bubble chambers 23 for distributing a shock load (imposed on or near one bubble chamber 23) along the entire length of the individual strip 21 of interconnected bubble chambers 23.

The interconnecting passageways 25 also function to facilitate bending or creasing of the packaging product 11 by folding or bending along a line passing through the passageways 23 at any one of a number of varied angles. This function will be better understood with reference to FIGS. 6 and 7 described in more detail below. This function enables the packaging product 11 to be highly conformable to enable and to cushion the object being shipped, as also will become more apparent from a review of FIGS. 6 and 7.

A seal line 27 produced by the inflating and sealing machine 19 (see the bottom part of FIG. 1) closes one end (the right hand end as viewed in FIG. 1) of each inflated strip 21.

The length of the inflated packaging product to be used for any particular application can be determined either by cutting across the inflated web 11 or by detaching along preformed perforation lines (not shown in FIG. 1).

The seal line 27 is formed by the inflating and sealing machine 19, but the seal line pattern on the upper part of the web 11 shown in FIG. 1 is preformed either by a pressing machine or by a continuous roller mechanism.

Pattern forming machines of these kinds are disclosed in several of the U.S. patents which are incorporated by reference in this application.

The web 11 is formed of a first sheet of film material and a second sheet of film material with both sheets having substantially equal lengths and substantially widths.

The first and second sheet can be separate sheets or can be a single sheet that is folded over to provide the two sheets.

The two sheets are joined together in a web by the pattern of seal lines shown in the top part of FIG. 1.

The pattern of seal lines shown in the top part of FIG. 1 form an inflation channel 31 which extends linearly along the length of web 11.

In the particular embodiment of the packaging product 11 shown in FIG. 1, the inflation channel 31 extends along one side edge portion of the web 11.

Figure 3:
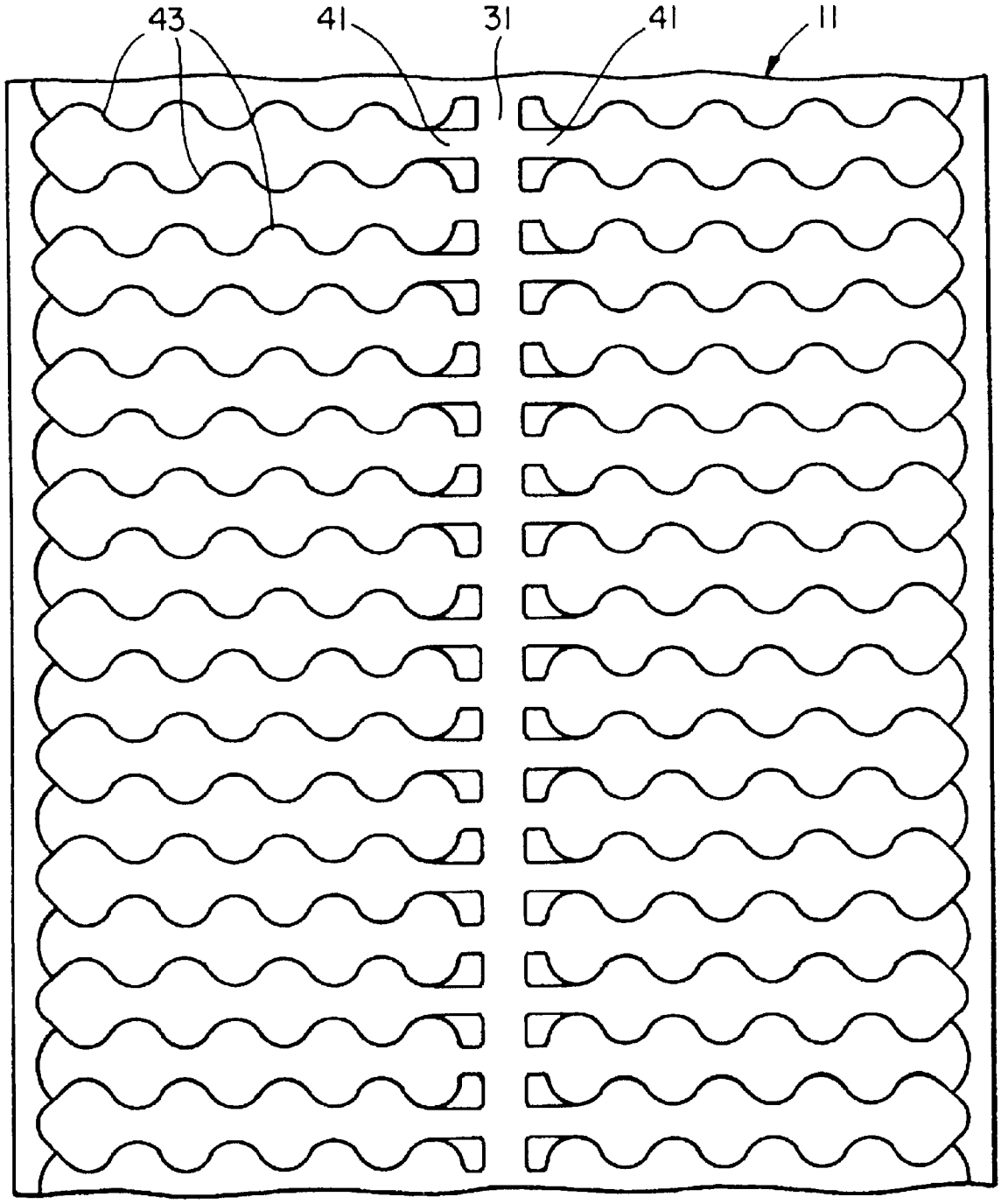
FIG. 3 is a plan view like FIG. 2 but showing a packaging product constructed in accordance with another embodiment of the present invention.

In the embodiment shown in FIG. 3, the inflation channel 31 extends linearly along a center portion of the web 11.

The inflation channel 31 is defined between spaced apart seal lines 33 and 35.

The seal line 33 is opened at spaced intervals to provide outlet ports 37. The outlet ports 37 function to permit a certain amount of the inflation pressure in the inflation channel 31 to be vented to atmosphere.

In addition, the air that exits from the outlet ports 37 can be sensed by a pressure transducer (as described in application Ser. No. 09/638,843 now U.S. Pat. No. 6,659,150 incorporated by reference in this application) to allow for accurate position sensing of the individual inflatable strips 21 as these strips move through the machine 19. This sensing of escaping air through the outlet ports 37 can be used as signals for counting the number of strips inflated in a particular run through the machine and can also be used to stop the movement of the web 18 through the machine, after one production run of a selected number of inflated strips, at a position which is the right position to start a subsequent production run of a selected number of inflated strips 21.

The seal line 35 is open at intervals to provide entrance ports 41. The entrance ports 41 permit pressurized air from the inflation channel 31 to enter the individual inflatable strips 21 for inflating the bubble chambers 23 and interconnecting passageways 25 (as described above).

Each individual and inflatable strip 21 is defined between two laterally extending seal lines 43.

In the preferred embodiments of the invention shown in FIGS. 1–7 each laterally extending seal line 43 serves as a common boundary between two immediately adjacent inflatable strips 21 so that the only area of the inflatable portion of the web 11 which cannot be inflated and used for cushioning is the very small area of the seal lines 43 themselves.

As can best be seen by viewing the lower part of FIG. 1, the bubble chambers 23 of one individual inflatable strip 21 are offset laterally with respect to the bubble chambers 23 of an immediately adjacent individual inflatable strip 21. A bubble chamber 23 in one strip is directly opposite a passageway 25 of an immediately adjacent inflatable strip 21.

The seal line 27 shown in the lower part of FIG. 1 is formed across the inlet ports 41 at the sealing station of the machine 19 as the web 11 is transported continuously and without interruption through the sealing station and through the machine 19.

The machine 19 shown in FIG. 1 is the same as the machine illustrated and described in detail in co-pending application Ser. No. 09/638,843 now U.S. Pat. No. 6,659,150 filed Aug. 14, 2000, entitled "Methods and Apparatus for Inflating and Sealing Pillows in Packaging", Andrew Perkins, Oliver M. Reyes, Phillip Borchard, and Nicholas P. De Luca, inventors, assigned to the same assignee as the assignee of this application and incorporated by reference in this application.

A short summary of the parts of that machine as shown in FIG. 1 of the drawings in this application will now be described.

The machine 19 includes a first set of film transport rollers 51, a second set of film transport rollers 53 and a drive mechanism, including a drive belt 55, for driving the film transport rollers 51 and 53.

An outlet bulb 57 of an inflation tube 59 is positioned within the inflation channel 31 and introduces air under pressure into the inflation channel for inflating the individual inflatable strips 21 by causing pressurized air to flow through the entrance ports 41.

The outlet ports 37 which are opposite certain ones of the entrance ports 41 serve to regulate the level of the air pressure within the inflation channel 31 (as described in more detail in co-pending application Ser. No. 09/638,843 now U.S. Pat. No. 6,659,150 incorporated by reference in this application).

The seal line 27 is formed across the entrance ports 41 as the strip of the film which contains the entrance ports 41 is passed through a sealing station. The film is engaged with a sealing wheel 61 on one side of the film 11 and is engaged with a heated sealing element on the other side of the film. The heated sealing element includes a fabric covered, electrically heated Nicrom wire.

A slitting station (not shown in FIG. 1 but described in application Ser. No. 09/638,843 now U.S. Pat. No. 6,659,150) slits the inflation channel 31 to permit the web 11 to pass over the inflation tube 59 after the seal line 27 has been formed by the machine 19.

The pressure of the inflation air can range from ½ pounds per square inch gauge to 10 pounds per square inch gauge.

The material of the two sheets making up the web 11 can be low density polyethylene or can be high density polyethylene. The thickness of the web 11 can be one mil to ten mils.

The height of an inflated bubble chamber 23 can be from ¼ inch to 9 inches.

The configuration of each seal line 43, as viewed from above in FIG. 1, is, in the preferred embodiments of the present invention, a wavy, undulating, curved configuration without corners or sharp bends that could concentrate stresses.

In a specific embodiment as illustrated in FIGS. 1–7 of the drawings, the configuration of a seal line 43 is generally sinusoidal, as viewed from directly above.

The center line of each individual inflatable strip 21 preferably extends orthogonally across the width of the web 11, but the center line could be itself a wavy configuration and could extend at some angle other than directly orthogonal.

Figure 2:
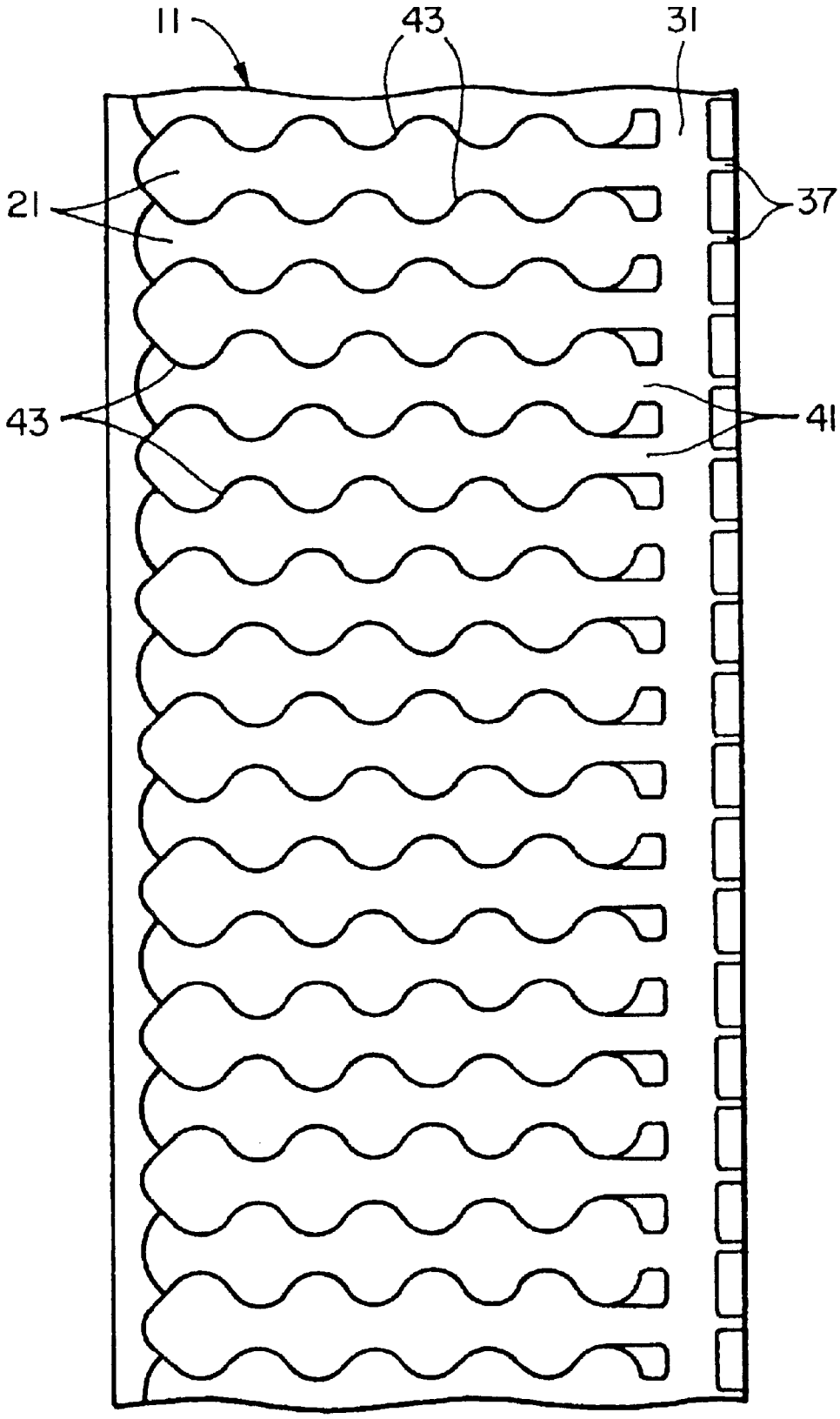
FIG. 2 is a top plan view of a portion of the uninflated web shown in FIG. 1.

FIG. 2 is an enlarged top plan view of a web 11 having the line pattern structure shown in the top part of FIG. 1.

FIG. 3 is a plan view like FIG. 2 but shows a packaging product constructed in accordance with another embodiment of the present invention. In FIG. 3 the inflation channel 31 extends through the center portion of the web 11.

In FIG. 2 the inflation channel 11 extends along one side portion of the web 11.

The embodiment of the patterned web 11 shown in FIG. 3 is inflated and sealed by an apparatus and method described in detail in co-pending application Ser. No. 09/439,552 filed Nov. 12, 1999 now U.S. Pat. No. 6,209,286, and titled "Machine and Method for Manufacturing a Continuous Production of Pneumatically Filled Inflatable Packaging Pillows", Andrew Perkins, Nicholas P. De Luca, and Phillip Borchard, inventors, and assigned to the same assignee as the assignee of this application, and incorporated by reference in this application.

In the embodiment shown in FIG. 3, two seal lines 27 are formed alongside the inflation channel 31 and across the inlet ports 41.

Figure 4:
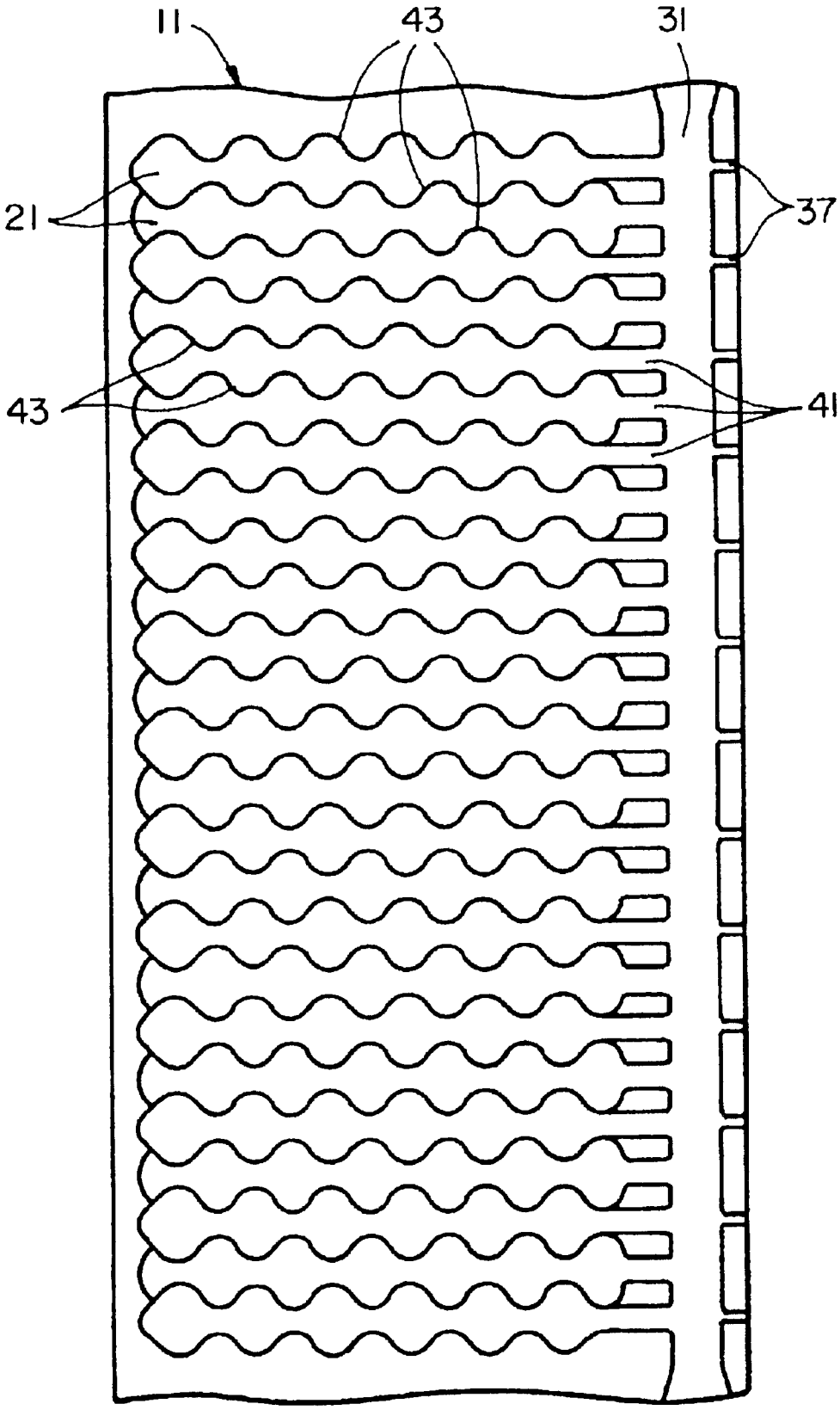
FIG. 4 is a view like FIG. 2 but showing a packaging product having bubble chambers which are smaller in size than those of FIG. 2.

FIG. 4 is a view like FIG. 2 but showing a packaging product having bubble chambers which are smaller in size than those of FIG. 2.

Figure 5:
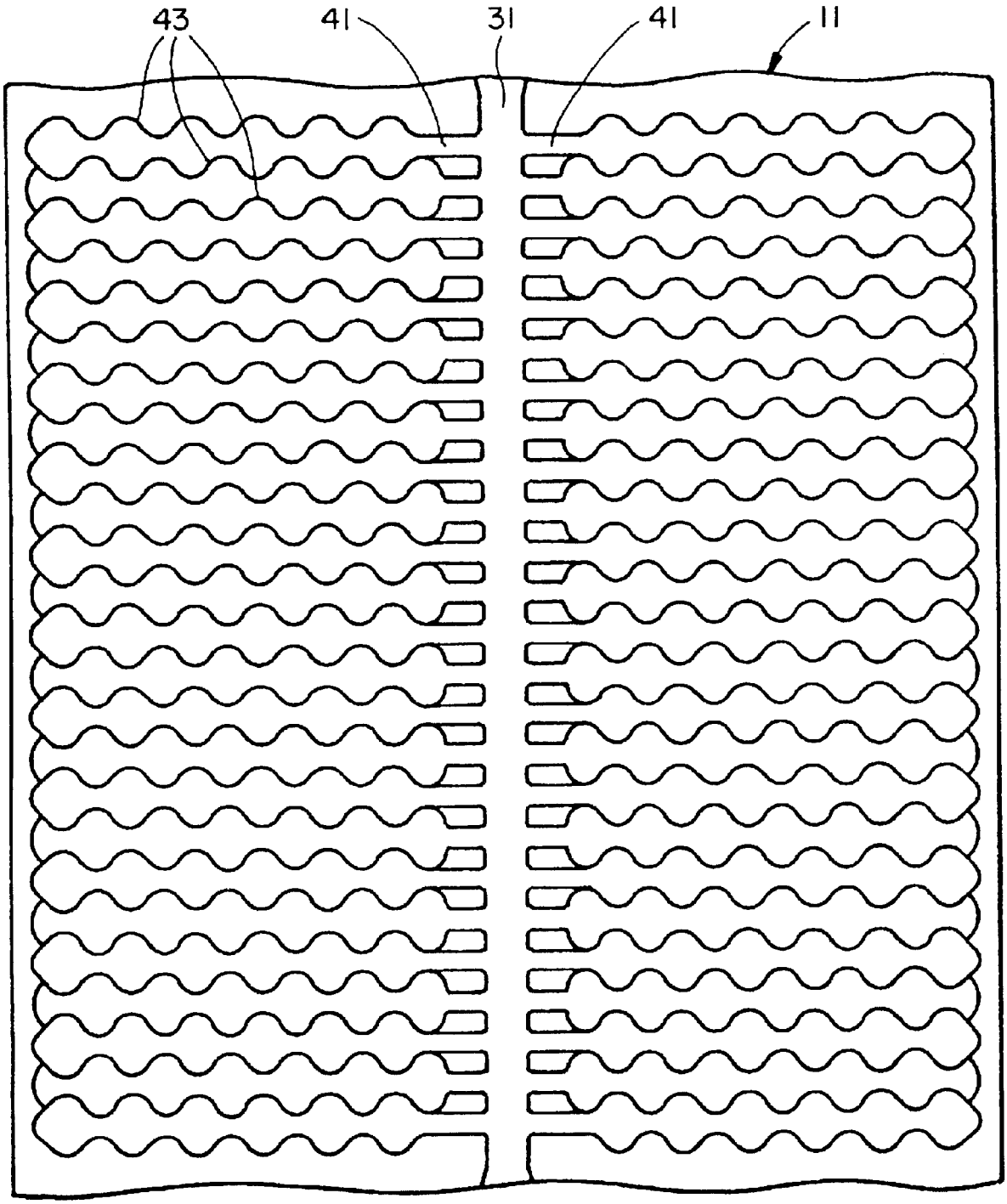
FIG. 5 is a view like FIG. 3 but showing a packaging product having smaller size bubble chambers.

FIG. 5 is a view like FIG. 3 but showing a packaging product having smaller size bubble chambers than FIG. 3.

FIG. 6 is an isometric view showing how the inflated packaging product 11 of the present invention is used to cushion a generally rectangular shaped object 71 within a shipping container 73.

FIG. 6 shows how the individual bubble chambers 23 are effectively engaged with all outer surfaces of the object 71 to envelope the object 71 within the conformable inflated packaging product 11.

As noted above, the interconnecting passageways 25 in particular are readily foldable and bendable along lines as needed to facilitate conforming of the inflated packaging product 11 to the particular object being shipped. The construction of the individual inflatable strips which permits a certain amount of bending or compressing of some parts of the inflated strip (by transferring pressurized air to other parts of the inflated strip) also facilitates conformation of the packaging product to the configuration of the object being shipped.

The conformability of the packaging product (the ability to wrap all surfaces of the object, including corner areas of the object) provides cushioning against shock loads imposed at any angle on the outer shipping container 11.

FIG. 6 also shows how the shape, size and volumes of the inflated bubble chambers 23 are large enough so that a single layer of the packaging product 11 can provide necessary cushioning for the object to be shipped.

FIG. 7 is an isometric view like FIG. 6 but shows the inflated packaging product 11 wrapped about a cup 75 to cushion the cup for shipment within the outer container 73.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A cellular cushioning material comprising two superposed sheets of film material joined together along a plurality of generally parallel, undulating seal lines arranged in a pattern such that adjacent ones of the seal lines are offset laterally of each other and form rows of spaced apart bubble chambers with flow passageways interconnecting adjacent ones of the bubble chambers in each row *and a last bubble chamber in each row being otherwise closed* so that air can shift between the chambers in a row to accommodate loads, the flow passageways in alternate rows being positioned between, aligned with, and formed by the same seal lines as the bubble chambers in the intermediate rows so there is no dead space between the bubble chambers and the flow passageways in adjacent rows, a longitudinally extending inflation channel, and laterally extending inlet ports interconnecting the inflation channel and one of the bubble chambers in each of the rows.

2. The cellular cushioning material of claim 1 wherein the undulating seal lines are generally sinusoidal.

3. A cellular cushioning material comprising two superposed sheets of film material joined together to form:

a longitudinally extending inflation channel near a longitudinally extending edge of the material;

a plurality of generally parallel, undulating seal lines arranged in a pattern such that adjacent ones of the seal lines are offset laterally of each other and form rows of spaced apart bubble chambers with flow passageways interconnecting adjacent ones of the bubble chambers in each row *and a last bubble chamber in each row being otherwise closed* so that air can shift between the chambers in a row to accommodate loads, the flow passageways in alternate rows being positioned between and aligned with the bubble chambers in the intermediate rows; and laterally extending entrance ports interconnecting the inflation channel and the first bubble chamber in each of the rows.

4. The cellular cushioning material of claim 3 wherein the seal lines are generally sinusoidal.

5. The cellular cushioning material of claim 3 wherein the bubble chambers are inflated, and the sheets of film material are sealed together along a longitudinally extending seal line which crosses and closes off the entrance ports.

6. The cellular cushioning material of claim 5 wherein each of the bubble chambers has a height on the order of ¼ inch to 9 inches.

7. A cellular cushioning material comprising two superposed sheets of film material joined together to form:

an inflation channel which extends longitudinally of the material near a lateral edge of the material;

a plurality of generally parallel, undulating seal lines which extend laterally on one side of the inflation channel and form rows of spaced apart bubble chambers with flow passageways interconnecting adjacent ones of the bubble chambers in each row *and a last bubble chamber in each row being otherwise closed* so that air can shift between the chambers in a row to accommodate loads; and laterally extending entrance ports interconnecting the inflation channel and the first bubble chamber in each of the rows.

8. The cellular cushioning material of claim 7 wherein the seal lines are generally sinusoidal.

9. The cellular cushioning material of claim 7 wherein bubble chambers are inflated, and the sheets of film material are sealed together along a longitudinally extending seal lines which crosses and closes off the entrance ports.

10. The cellular cushioning material of claim 9 wherein each of the inflated bubble chambers has a height on the order of ¼ inch to 9 inches.

11. The cellular cushioning material of claim 1 wherein the bubble chambers are inflated, and the sheets of film material are sealed together along a longitudinally extending seal line which crosses and closes off the entrance ports.

12. The cellular cushioning material of claim 1 wherein the inflation channel is positioned near an edge of the material, and the bubble chambers are located on only one side of the inflation channel.

13. The cellular cushioning material of claim 1 wherein the inflation channel is positioned between two edges of the material, and the bubble chambers are located on both sides of the inflation channel.

*14. A cellular cushioning material comprising two superposed sheets of film material joined together to form a plurality of curvilinear seal lines arranged in a pattern forming rows of spaced apart bubble chambers with a first chamber in each row having an opening near a longitudinal edge of the film material, and flow passageways interconnecting adjacent chambers in each row, wherein a last bubble chamber in each row is otherwise closed so that air can shift between the chambers in a row; wherein each row of chambers has an axis which is generally perpendicular to a longitudinal axis of the film material.*

*15. The cellular cushioning material of claim 14 wherein the curvilinear seal lines form generally circular chambers.*

*16. The cellular cushioning material of claim 14 wherein the film material comprises a single sheet folded over to provide the two superposed sheets.*

*17. The cellular cushioning material of claim 14 wherein adjacent rows of chambers share a common curvilinear seal line.*

*18. A cellular cushioning material comprising two superposed sheets of film material joined together to form a plurality of wavelike seal lines arranged in a pattern forming rows of spaced apart bubble chambers with a first chamber in each row having an opening near a longitudinal edge of the film material, and flow passageways interconnecting adjacent chambers in each row, wherein a last bubble chamber in each row is otherwise closed so that air can shift between the chambers in a row; wherein each row of chambers has an axis which is generally perpendicular to a longitudinal axis of the film material.*

*19. The cellular cushioning material of claim 18 wherein the wavelike seal lines are generally sinusoidal.*

*20. The cellular cushioning material of claim 18 wherein the film material comprises a single sheet folded over to provide the two superposed sheets.*

*21. The cellular cushioning material of claim 18 wherein adjacent rows of chambers share a common wavelike seal line.*

*22. An inflated cellular cushioning material comprising two superposed sheets of film material joined together to form a plurality of continuous curvilinear seal lines arranged in a pattern forming rows of spaced apart bubble chambers; wherein the chambers in each row have flow passageways interconnecting adjacent chambers so that air can shift between chambers in a row to accommodate loads; and wherein a first bubble chamber in each row is closed by a longitudinal seal line extending near an edge of the film material.*

*23. The inflated cellular cushioning material of claim 22 wherein each row of chambers has an axis which is generally perpendicular to a longitudinal axis of the film material.*

*24. The inflated cellular cushioning material of claim 22 wherein the curvilinear seal lines form generally circular chambers.*

*25. The inflated cellular cushioning material of claim 22 wherein adjacent rows of chambers share a common curvilinear seal line.*

*26. An inflated cellular cushioning material comprising two superposed sheets of film material joined together to form a plurality of continuous wavelike seal lines arranged in a pattern forming rows of spaced apart bubble chambers; wherein the chambers in each row have flow passageways interconnecting adjacent chambers so that air can shift between chambers in a row to accommodate loads; and wherein a first bubble chamber in each row is closed by a longitudinal seal line extending near an edge of the film material.*

*27. The inflated cellular cushioning material of claim 26 wherein each row of chambers has an axis which is generally perpendicular to a longitudinal axis of the film material.*

*28. The inflated cellular cushioning material of claim 26 wherein the wavelike seal lines are generally sinusoidal.*

*29. The inflated cellular cushioning material of claim 26 wherein adjacent rows of chambers share a common wavelike seal line.*

*30. A cellular cushioning material comprising two superposed sheets of film material joined together to form a plurality of seal lines arranged in a pattern forming rows of spaced apart chambers with a first chamber in each row having an opening near a longitudinal edge of the film material, and relatively narrow flow passageways interconnecting adjacent chambers in each row, wherein a last bubble chamber in each row is otherwise closed so that air can shift between the chambers in a row; wherein the relatively narrow flow passageways are free of corner shapes or sharp bends.*

*31. The cellular cushioning material of claim 30 wherein the seal lines form generally circular chambers.*

*32. The cellular cushioning material of claim 30 wherein the film material comprises a single sheet folded over to provide the two superposed sheets.*

*33. The cellular cushioning material of claim 30 wherein adjacent rows of chambers share a common seal line.*

*34. The cellular cushioning material of claim 30 wherein each row of chambers has an axis which is generally perpendicular to a longitudinal axis of the film material.*

*35. The cellular cushioning material of claim 30 wherein the seal lines are generally sinusoidal.*

*36. An inflated cellular cushioning material comprising two superposed sheets of film material joined together to form a plurality of continuous seal lines arranged in a pattern forming rows of spaced apart chambers; wherein the chambers in each row have relatively narrow flow passageways interconnecting adjacent chambers so that air can shift between chambers in a row to accommodate loads; wherein*

*the relatively narrow flow passageways are free of corner shapes or sharp bends; and wherein a first chamber in each row is closed by a longitudinal seal line extending near an edge of the film material.*

*37. The inflated cellular cushioning material of claim 36 wherein each row of chambers has an axis which is generally perpendicular to a longitudinal axis of the film material.*

*38. The inflated cellular cushioning material of claim 36 wherein the seal lines form generally circular chambers.*

*39. The inflated cellular cushioning material of claim 36 wherein adjacent rows of chambers share a common seal line.*

* * * * *